(12) United States Patent
Lin

(10) Patent No.: US 7,616,434 B2
(45) Date of Patent: Nov. 10, 2009

(54) DESKTOP LIQUID CRYSTAL DISPLAYING DEVICE

(75) Inventor: Feng-Li Lin, Taishan Township, Taipei County (TW)

(73) Assignee: Gigno Technology Co., Ltd., Taipei (TW)

( * ) Notice: Subject to any disclaimer, the term of this patent is extended or adjusted under 35 U.S.C. 154(b) by 231 days.

(21) Appl. No.: 11/783,540

(22) Filed: Apr. 10, 2007

(65) Prior Publication Data

US 2007/0247796 A1  Oct. 25, 2007

(30) Foreign Application Priority Data

Apr. 25, 2006 (TW) ............... 95114738 A

(51) Int. Cl.
*G06F 1/16* (2006.01)
(52) U.S. Cl. ............... 361/679.22; 248/122.1; 248/371
(58) Field of Classification Search ........... 361/681
See application file for complete search history.

(56) References Cited

U.S. PATENT DOCUMENTS 6,575,419 B1 * 6/2003 Masuda et al. ........... 248/371
6,833,988 B2 * 12/2004 Kamphuis et al. ........... 361/681
6,940,714 B2 * 9/2005 Helot et al. ............... 361/681
6,987,666 B2 * 1/2006 Medica et al. ............. 361/681
7,126,815 B2 * 10/2006 Hwang et al. ............. 361/681
7,251,125 B2 * 7/2007 Heckerman ........... 361/679.27
2005/0207100 A1 * 9/2005 Heckerman ............... 361/681
2005/0270731 A1 * 12/2005 Yin ........................ 361/681
2006/0023405 A1 * 2/2006 Lin ........................ 361/681
2006/0108483 A1 * 5/2006 Wolff et al. ............. 248/122.1

* cited by examiner

Primary Examiner—Lisa Lea-Edmonds
(74) Attorney, Agent, or Firm—Birch, Stewart, Kolasch & Birch, LLP

(57) ABSTRACT

A desktop liquid crystal displaying (LCD) device, which can be disposed on a surface, includes an LCD monitor, a first frame and a second frame. The LCD monitor has a bottom side facing the surface. The first frame and the second frame are mounted on the LCD monitor. The first frame and the second frame protrude from the bottom side of the LCD monitor towards the surface and are placed over the surface to support the LCD monitor. Portions of the first frame and the second frame extruding from the bottom side of the LCD monitor are distanced apart over 25 centimeters.

21 Claims, 7 Drawing Sheets

DESKTOP LIQUID CRYSTAL DISPLAYING DEVICE

CROSS REFERENCE TO RELATED APPLICATIONS

This Non-provisional application claims priority under 35 U.S.C. §119(a) on Patent Application No(s). 095114738 filed in Taiwan, Republic of China on Apr. 25, 2006, the entire contents of which are hereby incorporated by reference.

BACKGROUND OF THE INVENTION

1. Field of Invention

The invention relates to a liquid crystal displaying (LCD) device, and, in particular, to a desktop LCD device.

2. Related Art

With the rapid growth of the information industry, various types of electronic products have been gradually popularized, and a new generation of products is gradually getting more and more exquisite. Taking the displaying device of the computer as an example, the conventional cathode ray tube displaying devices having huge sizes have been gradually replaced with miniaturized LCD devices.

Referring to FIG. 1, a conventional desktop LCD device 1 includes a LCD monitor 11 and a support frame 12 placed on a desktop 21 and mounted on the LCD monitor 11 to support the LCD monitor 11. A user operates a computer 23 through a keyboard 22 on the desktop 21. The LCD monitor 11 displays a frame of the computer 23 so that the user may watch the frame and perform operations. Generally speaking, the keyboard 22 is disposed in front of and adjacent to the LCD monitor 11 so that the user may watch the frame of the LCD monitor 11 and operate the computer 23 conveniently.

The desktop LCD device has a wider display range than the notebook computer and the displaying effect and capability of the desktop LCD device are also better. So, the notebook computer may be externally connected to the desktop LCD device and displays the frame on the desktop LCD device so that the user may watch the desktop LCD device and operate the notebook computer.

As shown in FIG. 2, the conventional desktop LCD device 1 is used in conjunction with a notebook computer 24. The user may operate the notebook computer 24 through a keyboard 25 and a touch panel 26 (or a track ball and a mouse) on the notebook computer 24, and the notebook computer 24 outputs the frame to the LCD monitor 11 in the VGA (or DVI) format through a video output port. Thus, the user may watch the LCD monitor 11 and operate the notebook computer 24.

In order to make the user clearly watch the LCD monitor 11 and conveniently operate the notebook computer, the notebook computer 24 is usually placed adjacent to and in front of the LCD monitor 11. However, when the user is operating the keyboard 25 or the touch panel 26, a monitor 27 of the notebook computer 24 is inevitably opened. At this time, the monitor 27 shields the LCD monitor 11. In order to prevent this condition from happening, the user has to close the monitor 27 of the notebook computer 24 and properly shift the notebook computer 24 in order to match with the LCD monitor 11 and the support frame 12 thereunder. However, the notebook computer 24 occupies a larger area on the desktop 21. The smaller desktop 21 does not allow the notebook computer 24 to be used in conjunction with the desktop LCD device 1. In addition, the keyboard 25 or the touch panel 26 is farther from the desktop LCD device 1, so the user may not clearly see the frame of the LCD monitor 11 so that the notebook computer 24 cannot be operated conveniently.

Thus, it is an important subject of the invention to provide a desktop LCD device capable of solving the above-mentioned problem by providing a reserved space for a notebook computer (or other electronic devices) so that the notebook computer can be disposed adjacent to the desktop LCD device without shielding the displaying monitor thereof, and the user can watch the LCD monitor and operate the notebook computer.

SUMMARY OF THE INVENTION

In view of the foregoing, the invention is to provide a desktop LCD device having a reserved space for another electronic device.

To achieve the above, the invention discloses a desktop liquid crystal displaying (LCD) device, which can be disposed on a surface. The desktop LCD device includes a LCD monitor, a first frame and a second frame. The LCD monitor has a bottom side facing the surface. The first frame and the second frame are mounted on the LCD monitor. The first frame and the second frame protrude from the bottom side of the LCD monitor towards the surface and are placed over the surface to support the LCD monitor. Portions of the first frame and the second frame extruding from the bottom side of the LCD monitor are distanced apart over 25 centimeters.

To achieve the above, the invention also discloses a desktop liquid crystal displaying (LCD) device, which can be disposed on a surface. The desktop LCD device includes an LCD monitor, a connecting element, a first frame and a second frame. The LCD monitor has a bottom side facing the surface. The connecting element is mounted on a backside of the LCD monitor. The first frame is mounted on one end of the connecting element, and the second frame is mounted on the other end of the connecting element. The first frame and the second frame protrude from the bottom side of the LCD monitor towards the surface and are placed over the surface to support the LCD monitor. Portions of the first frame and the second frame extruding from the bottom side of the LCD monitor are distanced apart over 25 centimeters.

As mentioned above, the distance between portions of the first frame and the second frame, which protrude from the bottom side, is substantially greater than 25 centimeters in the desktop LCD device according to the invention. Thus, another electronic device may be placed between the first frame and the second frame. Consequently, the electronic device can be placed adjacent to the desktop LCD device without shielding the LCD monitor.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
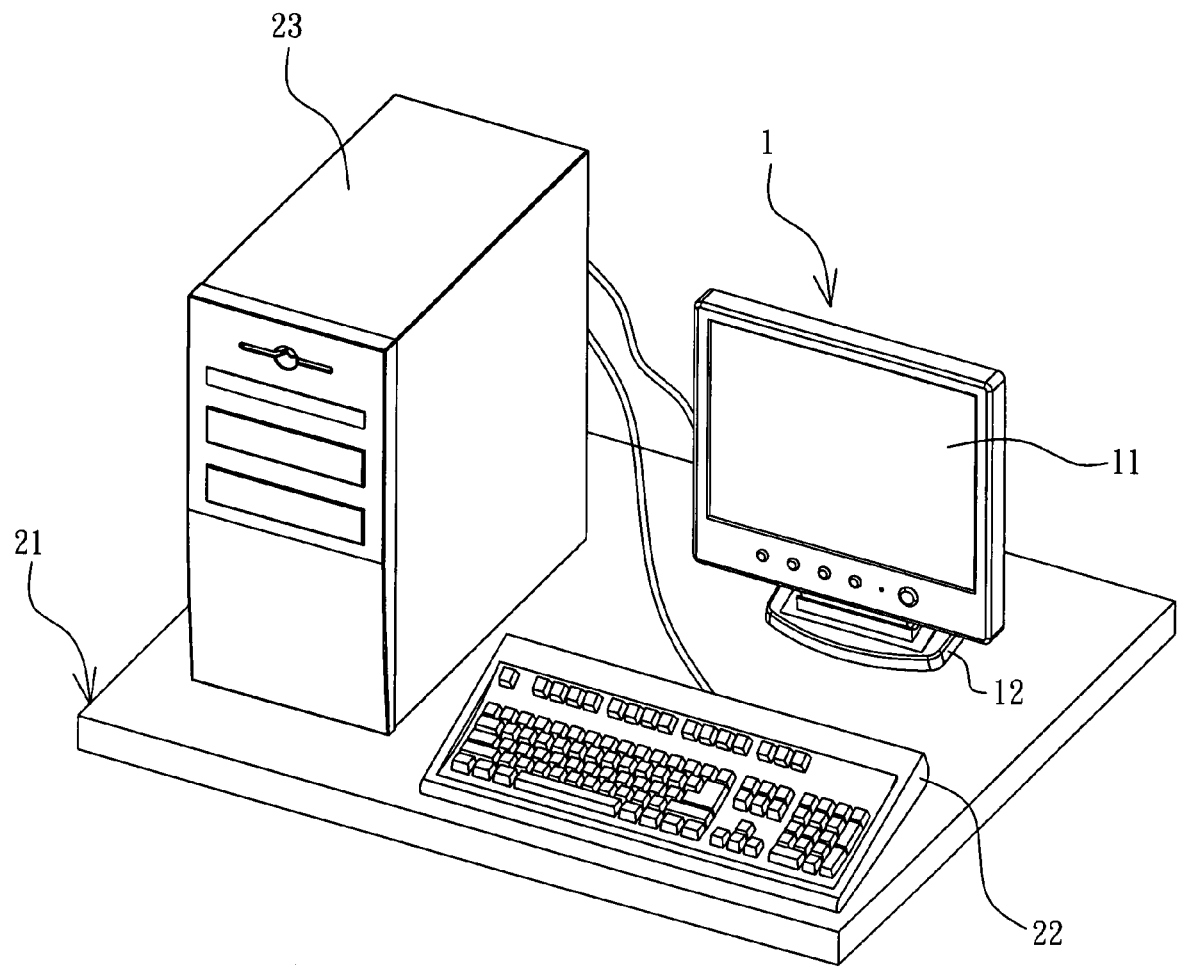
FIG. 1 is a schematic illustration showing a conventional desktop LCD device used in conjunction with a desktop computer.
Figure 2:
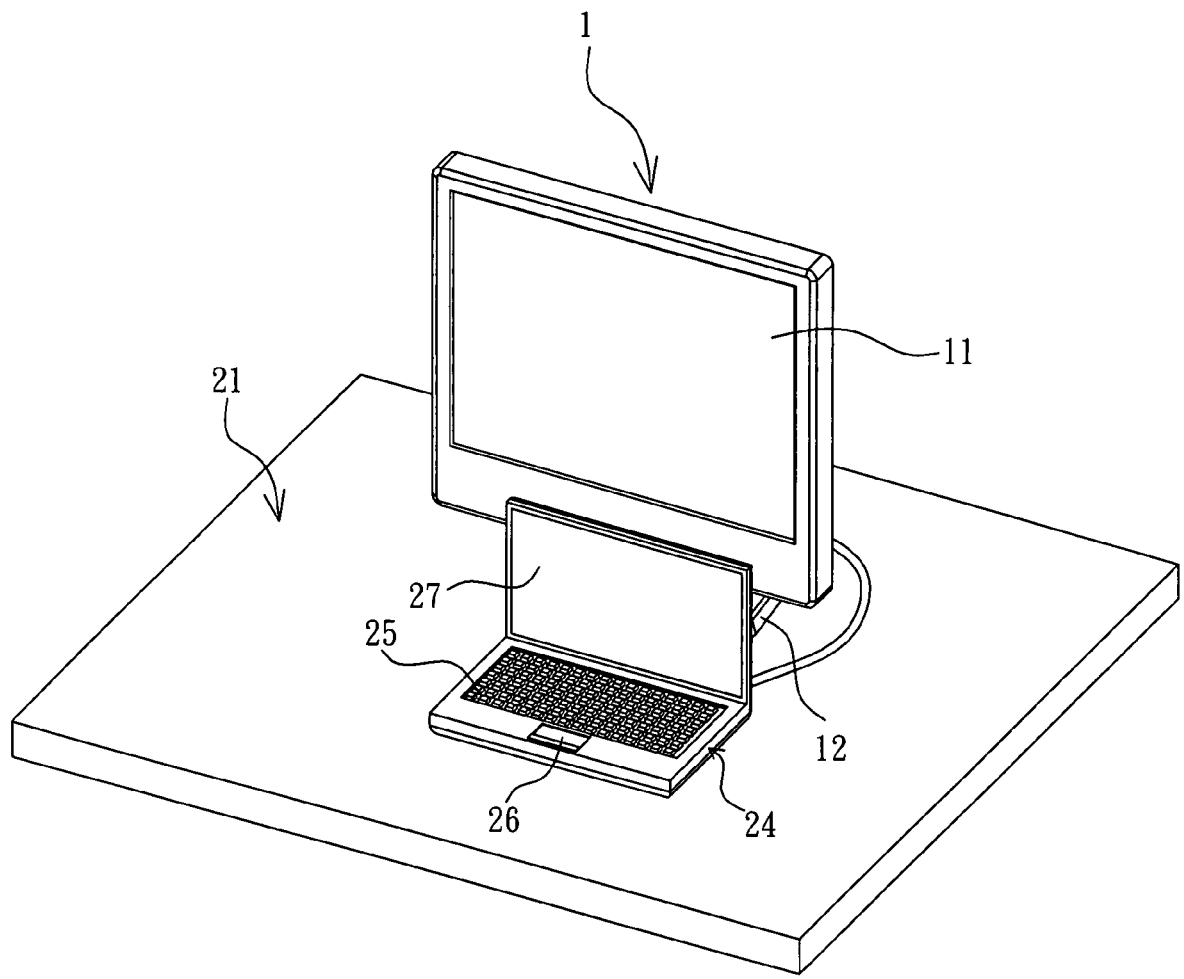
FIG. 2 is a schematic illustration showing the desktop LCD device used in conjunction with a notebook computer.
Figure 3:
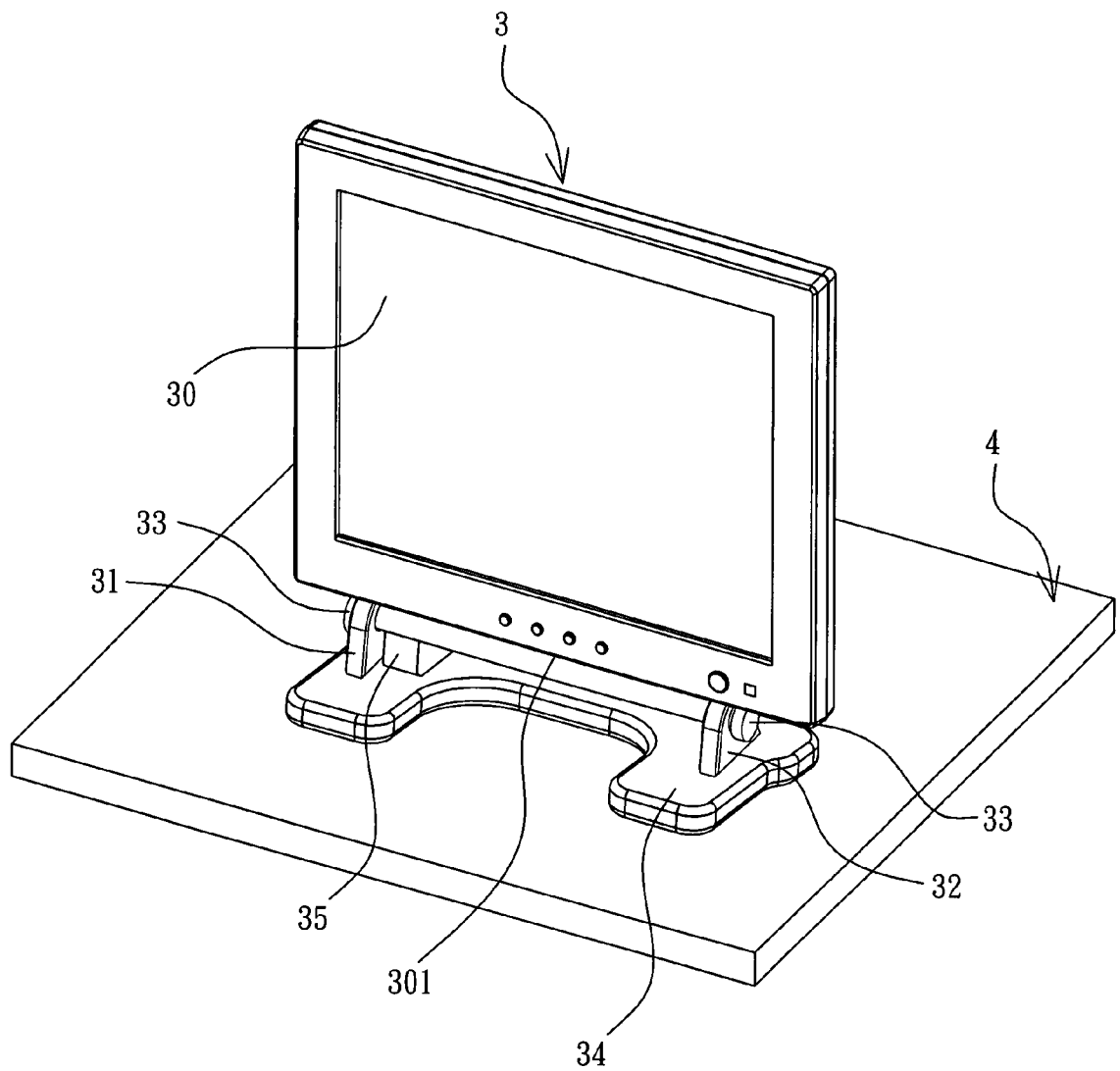
FIG. 3 is a schematic illustration showing a desktop LCD device according to a preferred embodiment of the invention.

Referring to FIG. 3, a desktop LCD device 3 according to a first embodiment of the invention is to be placed on a surface 4 and includes a LCD monitor 30, a first frame 31 and a second frame 32. The LCD monitor 30 has a bottom side 301 facing the surface 4. The first frame 31 and the second frame 32 are mounted on the LCD monitor 30 and placed over the surface 4 to support the LCD monitor 30. In addition, the first frame 31 and the second frame 32 protrude from the bottom side 301 of the LCD monitor 301 towards the surface 4. A distance between the portions of the first frame 31 and the second frame 32, which protrude from the bottom side 301, is substantially greater than 25 centimeters.

In this embodiment, the desktop LCD device 3 further includes a rotating shaft 33 mounted on the bottom side 301 of the LCD monitor 30. The first frame 31 is mounted around the rotating shaft 33 and thus mounted on the bottom side 301 of the LCD monitor 30 through the rotating shaft 33 so that the user may adjust an angle of the LCD monitor 30.

In order to secure the desktop LCD device 3 and prevent the LCD monitor 30 from falling down due to the too-great angle, the desktop LCD device 3 further includes a base 34 placed on the surface 4. The first frame 31 and the second frame 32 are mounted on the base 34 and thus placed over the surface 4 through the base 34.

Figure 4:
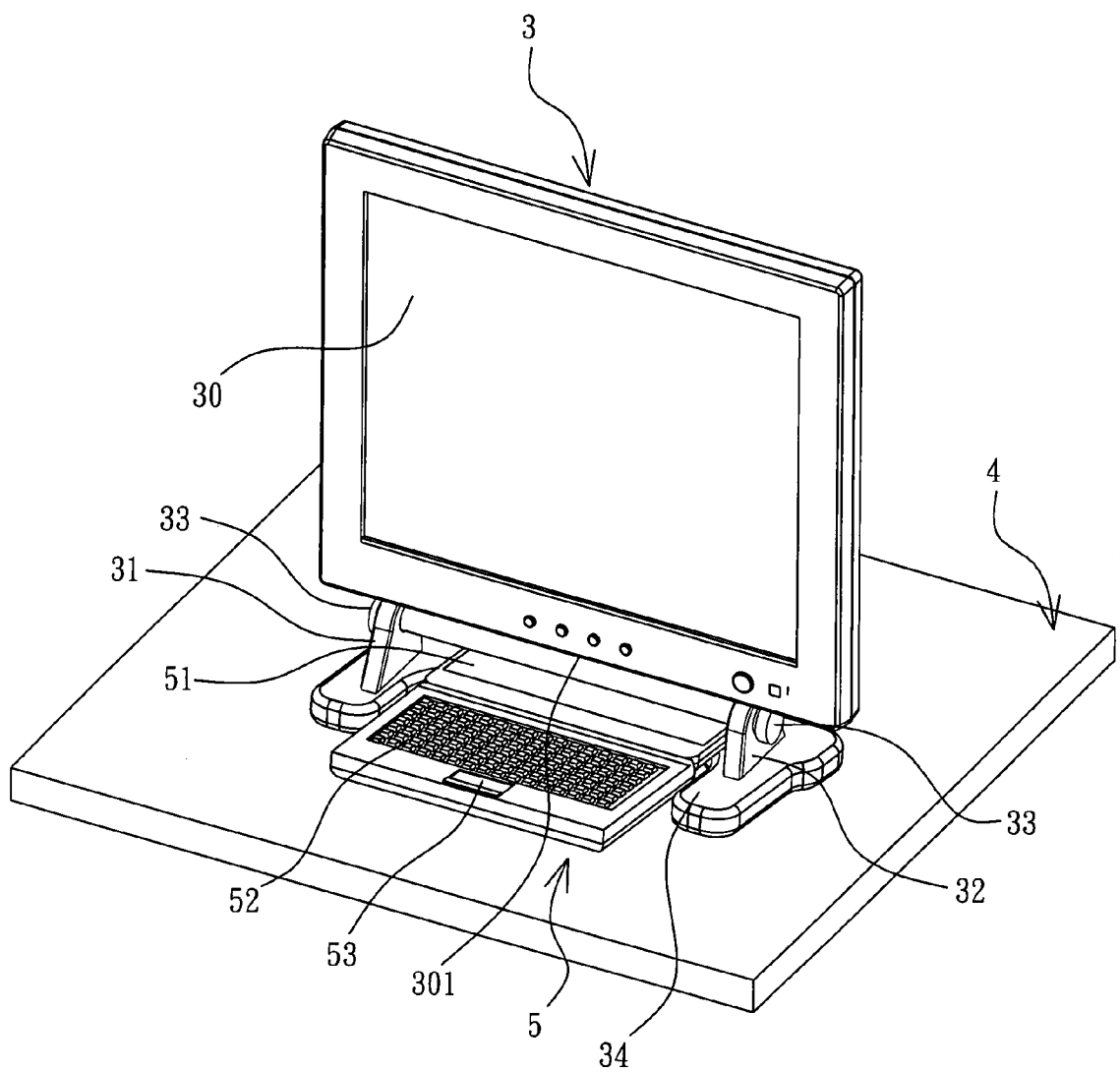
FIG. 4 is a schematic illustration showing the desktop LCD device of FIG. 3 used in conjunction with a notebook computer.

As shown in FIG. 4, the minimum distance between the first frame 31 and the second frame 32 is greater than 25 centimeters at the location between the bottom side 301 and the surface 4. So, a notebook computer 5 may be placed between the first frame 31 and the second frame 32. Compared with the prior art, a reserved space is formed in the desktop LCD device 3 so that the notebook computer 5. (or other electronic devices) may be placed in the reserved space, and a monitor 51 of the notebook computer 5 may be placed between the first frame 31 and the second frame 32. Consequently, the monitor 51 of the notebook computer. 5 cannot shield the LCD monitor 30, and the input apparatuses, such as a keyboard 52 or a touch panel 53, in the notebook computer 5 cannot be too distant from the LCD monitor 30 so that the user can easily watch the LCD monitor 30 and operate the keyboard 52 or touch panel 53 of the notebook computer 5. Generally speaking, a 12" notebook computer has a width greater than 24 centimeters. If a larger notebook computer has to be placed, the distance between the first frame 31 and the second frame 32 has to be increased properly.

On the other hand, in order to make the notebook computer 5 be more conveniently placed under the desktop LCD device 3, the desktop LCD device 3 is supported by two frames distant from each other by more than 25 centimeters, and no frame for interfering with the notebook computer 5 s provided on the back of the desktop LCD device 3.

One portion of the base 34 is placed on the back of the LCD monitor 30, and the height of the base 34 is substantially the same as that of a main frame 54 of the notebook computer 5. Thus, when the notebook computer 5 is opened, its monitor 51 may be placed on the base 34 between the first frame 31 and the second frame 32.

In addition, the desktop LCD device 3 further includes a wireless receiver 35 for receiving a frame signal transmitted from the notebook computer 5 so that the LCD monitor 30 displays a content of the frame signal. Therefore, when the notebook computer 5 is placed between the first frame 31 and the second frame 32, no additional video line has to be provided to connect the notebook computer 5 to the LCD monitor 30. Thus, it is possible to improve the condition of the complicated cables arranged on the surface 4 of the desktop.

Figure 5:
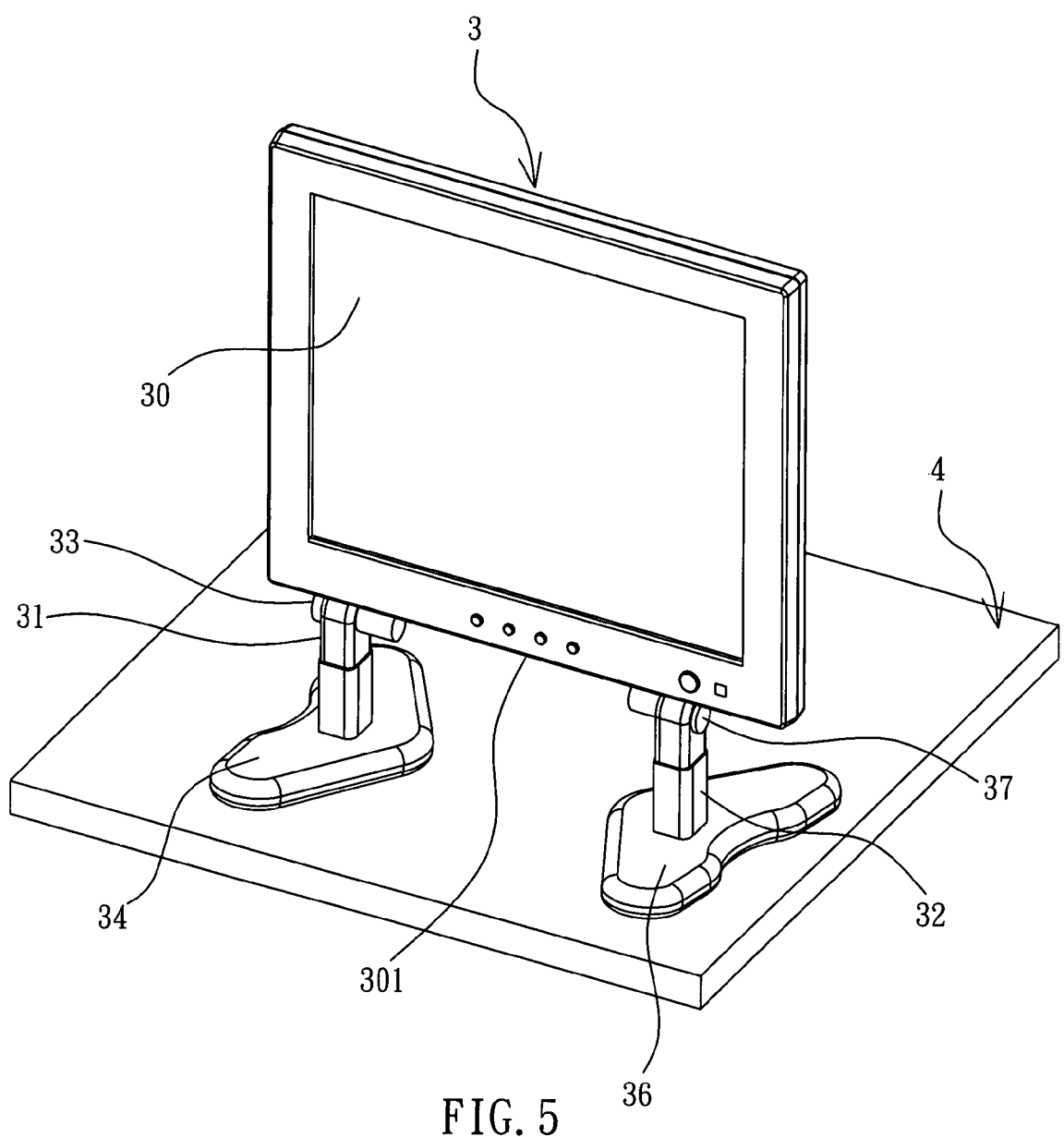
FIGS. 5 to 7 are other schematic illustrations showing desktop LCD devices according to other embodiments of the invention.

As shown in FIG. 5, what is different from FIG. 3 is that the desktop LCD device 3 comprises two rotating shafts 33 and 37, and the first frame 31 and the second frame 32 are retractable frames. The first frame 31 and the second frame 32 are respectively mounted on two bases 34 and 36 placed on the surface 4. The user may adjust a length of each of the first retractable frame 31 and the second retractable frame 32 according to the thickness of the notebook computer 5 so as to change the height from the LCD monitor 30 to the surface 4, and the notebook computer 5 can be placed on the surface 4 and between the first frame 31 and the second frame 32 smoothly.

In addition, because no supporting element is formed on the back of the LCD monitor 30, the bases 34 and 36 extend backwards so that the center of gravity of the LCD monitor 30 may fall between the bases 34 and 36 in order to prevent the LCD monitor 30 from turnover backwards.

Figure 6:
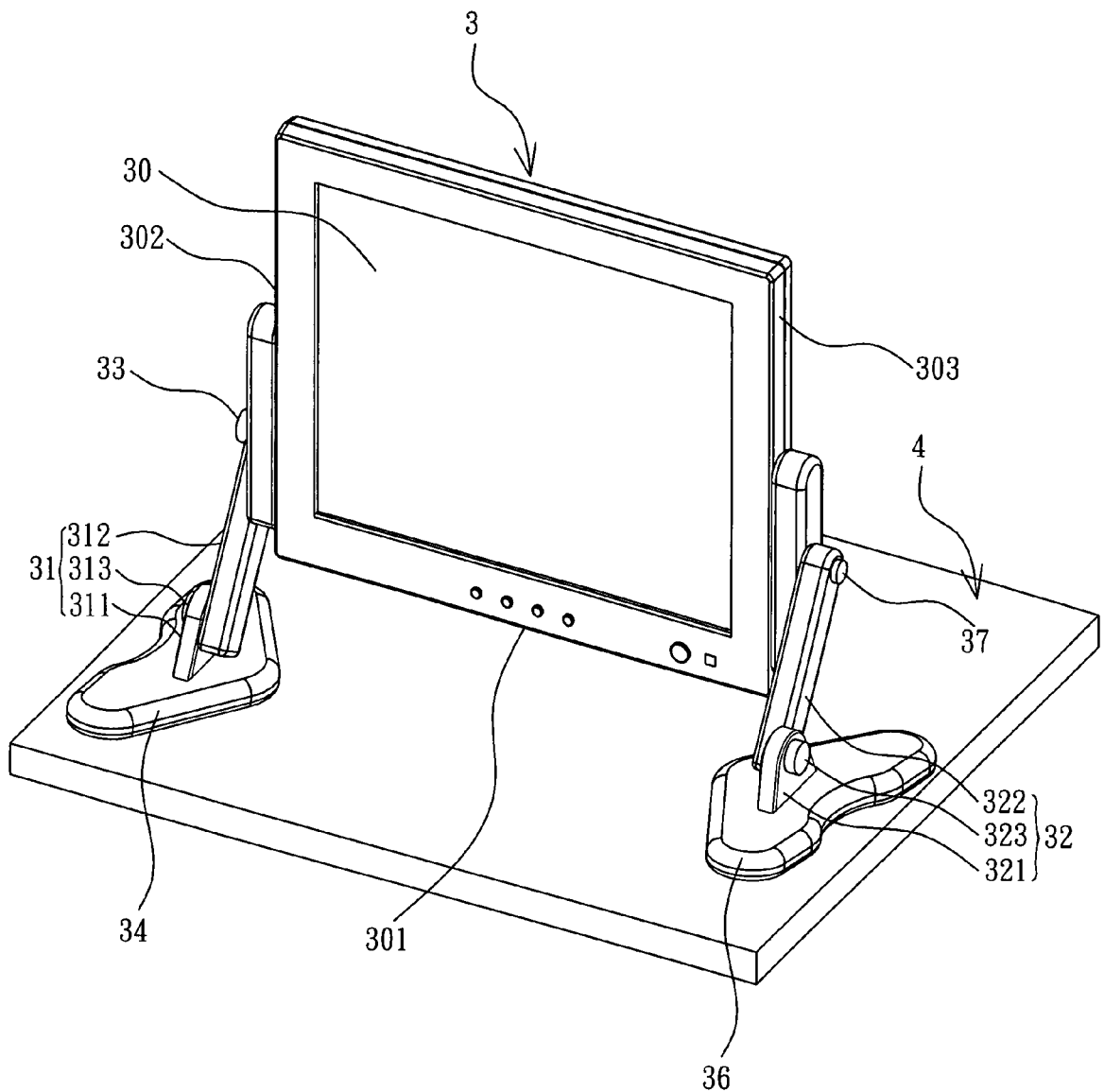

As shown in FIG. 6, what is different from FIG. 3 is that the first frame 31 includes a bracket 311, a link 312 and a rotating shaft 313, and the second frame 32 includes a bracket 321, a link 322 and a rotating shaft 323. The rotating shafts 33 and 37 are respectively mounted on two lateral sides 302 and 303 of the LCD monitor 30 erecting over the surface 4.

First ends of the bracket 311 and the link 312 are mounted around the rotating shaft 313. The bracket 311 is mounted on the base 34. A second end of the link 312 is mounted around the rotating shaft 33. The link 312 is mounted on a lateral side 302 of the LCD monitor 30 through the rotating shaft 33. First ends of the bracket 321 and the link 322 are mounted around the rotating shaft 323. The bracket 321 is mounted on a base 36. A second end of the link. 322 is mounted around a rotating shaft 37. The link 322 is mounted on a lateral side 303 of the LCD monitor 30 through the rotating shaft 37. Thus, adjusting the tilt angles of the links 312 and 322 may adjust the height of the LCD monitor 30. In addition, the rotating shafts 33 and 37 may be fixed to the LCD monitor 30 so that the angle of the LCD monitor 30 may be adjusted.

Because the first frame 31 and the second frame 32 are respectively disposed on two lateral sides 302 and 303 of the LCD monitor 30, a larger space under the LCD monitor 30 may be provided to accommodate the notebook computer 5 or other electronic devices.

Figure 7:
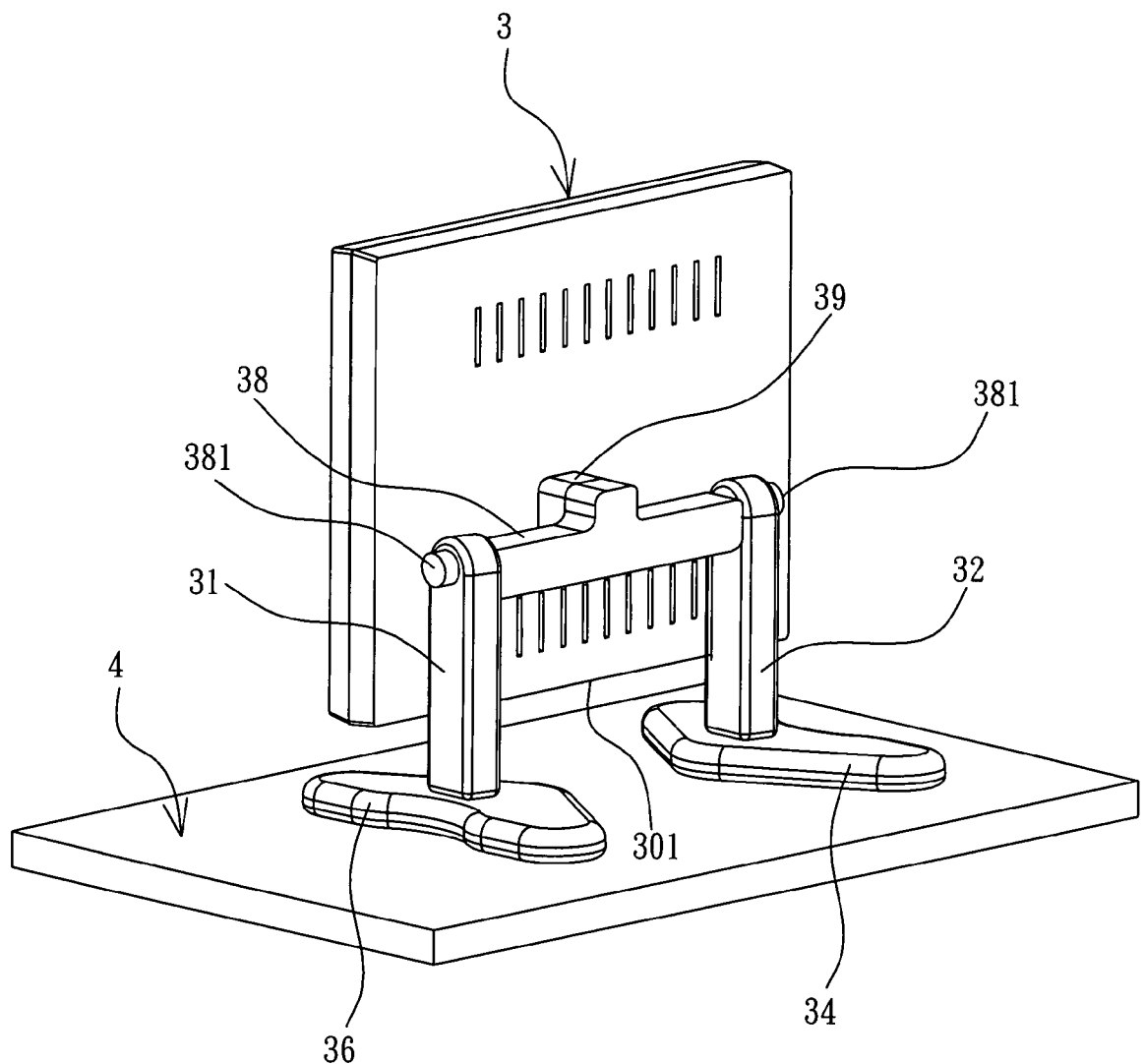

As shown in FIG. 7, what is different from FIG. 3 is that the desktop LCD device 3 further includes a connecting element 38 and a wall-mount bracket 39. The connecting element 38 includes a rotating shaft 381, the first frame 31 is mounted on one end of the rotating shaft 381, and the second frame 32 is mounted on the other end of the rotating shaft 381 so that the angle of the LCD monitor 30 is adjustable. The wall-mount bracket 39 is mounted on the backside of the LCD monitor 30, and the connecting element 38 is mounted on the wall-mount bracket 39 and thus mounted on a backside 304 of the LCD monitor 30 through the wall-mount bracket 39. The wall-mount bracket 39 can satisfy the VESA specification to facilitate the mounting of the connecting element 38. Consequently, the connecting element 38, the first frame 31, the second frame 32 and the bases 34 and 36 may be combined together to form a set of monitor supporting seat assembly, an the distance between the first frame 31 and the second frame 32 may be changed in response to the notebook computers or other electronic devices, which have different sizes and are located under the LCD monitor. Thus, diversifies options may be provided for the user.

The main feature of the desktop LCD device of the invention is that there are plural frames for supporting the LCD monitor, and the distance between the portions of the first frame and the second frame protruding from the bottom side of the LCD monitor is substantially greater than 25 centimeters. Thus, the electronic device such as a notebook computer can be placed under the LCD monitor conveniently.

In summary, the distance between portions of the first frame and the second frame, which protrude from the bottom side, is substantially greater than 25 centimeters in the desktop LCD device according to the invention. Thus, another electronic device may be placed between the first frame and the second frame. Consequently, the electronic device can be placed adjacent to the desktop LCD device without shielding the LCD monitor.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A desktop liquid crystal displaying (LCD) device to be disposed on a surface, the LCD device comprising:
    an LCD monitor having a bottom side facing the surface;
    a first frame mounted on the LCD monitor; and
    a second frame mounted on the LCD monitor, wherein the first frame and the second frame protrude from the bottom side of the LCD monitor towards the surface and are placed over the surface to support the LCD monitor, and portions of the first frame and the second frame extruding from the bottom side of the LCD monitor are distanced apart over 25 centimeters.

2. The desktop LCD device according to claim 1 being applied to a notebook computer, wherein the notebook computer is placed on the surface and between the first frame and the second frame.

3. The desktop LCD device according to claim 1 being applied to a notebook computer, wherein the desktop LCD device further comprises:
    a wireless receiver for receiving a frame signal transmitted from the notebook computer so that the LCD monitor displays an image according to the frame signal.

4. The desktop LCD device according to claim 1, further comprising a first rotating shaft mounted on the LCD monitor, wherein the first frame is mounted around the first rotating shaft and thus mounted on the LCD monitor through the first rotating shaft.

5. The desktop LCD device according to claim 4, wherein the first rotating shaft is mounted on the bottom side of the LCD monitor.

6. The desktop LCD device according to claim 4, wherein the first rotating shaft is mounted on one side of the LCD monitor erecting over the surface.

7. The desktop LCD device according to claim 1, further comprising a second rotating shaft mounted on the LCD monitor, wherein the second frame is mounted around the second rotating shaft and thus mounted on the LCD monitor through the second rotating shaft.

8. The desktop LCD device according to claim 7, wherein the second rotating shaft is mounted on the bottom side of the LCD monitor.

9. The desktop LCD device according to claim 7, wherein the second rotating shaft is mounted on one side of the LCD monitor erecting over the surface.

10. The desktop LCD device according to claim 4, wherein the first frame is mounted around one end of the first rotating shaft and the second frame is mounted around the other end of the first rotating shaft so that the second frame is mounted on the LCD monitor through the first rotating shaft.

11. The desktop LCD device according to claim 10, wherein the first rotating shaft is mounted on a backside of the LCD monitor.

12. The desktop LCD device according to claim 11, further comprising a wall-mount bracket mounted on the backside of the LCD monitor, wherein the first rotating shaft is mounted on the wall-mount bracket and thus mounted on the backside of the LCD monitor through the wall-mount bracket.

13. The desktop LCD device according to claim 1, wherein the first frame and the second frame are retractable.

14. The desktop LCD device according to claim 1, further comprising a base disposed on the surface, wherein the first frame and the second frame are mounted on the base and thus placed over the surface through the base.

15. A desktop liquid crystal displaying (LCD) device to be placed on a surface. the LCD device comprising:
    an LCD monitor having a bottom side facing the surface;
    a connecting clement mounted on a backside of the LCD monitor;
    a first frame mounted on one end of the connecting element; and
    a second frame mounted on the other end of the connecting element, wherein the first frame and the second frame protrude from the bottom side of the LCD monitor towards the surface and are placed over the surface to support the LCD monitor, and portions of the first frame and the second frame extruding from the bottom side of the LCD monitor are distanced apart over 25 centimeters.

16. The desktop LCD device according to claim 15 being applied to a notebook computer, wherein the notebook computer is placed on the surface and between the first frame and the second frame.

17. The desktop LCD device according to claim 15 being applied to a notebook computer, wherein the desktop LCD device further comprises:
    a wireless receiver for receiving a frame signal transmitted from the notebook computer so that the LCD monitor displays an image according to the frame signal.

18. The desktop LCD device according to claim 15, further comprising a wall- mount bracket mounted on the backside of the LCD monitor, wherein the first rotating shaft is mounted on the wall-mount bracket and thus mounted on the backside of the LCD monitor through the wall-mount bracket.

19. The desktop LCD device according to claim 15, wherein the first frame and the second frame are retractable.

20. The desktop LCD device according to claim 15, further comprising a base disposed on the surface, wherein the first frame and the second frame are mounted on the base and thus placed over the surface through the base.

21. The desktop LCD device according to claim 2, wherein a monitor of the notebook computer is placed between the first frame and the second frame.

* * * * *